United States Patent [19]

Finch

[11] 4,028,180

[45] June 7, 1977

[54] SUPPORT GRID FOR FUEL ELEMENTS IN A NUCLEAR REACTOR

[75] Inventor: Lester M. Finch, Pasco, Wash.

[73] Assignee: The United States of America as represented by the United States Energy Research and Development Administration, Washington, D.C.

[22] Filed: Mar. 16, 1976

[21] Appl. No.: 667,815

[52] U.S. Cl. .................................. 176/78; 176/76
[51] Int. Cl.² ........................................ G21C 3/30
[58] Field of Search ............... 176/76, 78; 267/164, 267/165

[56] References Cited

UNITED STATES PATENTS

| 3,751,335 | 8/1973 | Keith ................................. 176/78 |
| 3,801,088 | 4/1974 | Piepers ............................ 267/164 |
| 3,920,515 | 11/1975 | Ferrari .............................. 176/78 |
| 3,929,569 | 12/1975 | Piepers ............................. 176/78 |
| 3,966,550 | 6/1976 | Foulds .............................. 176/78 |
| R28,079 | 7/1974 | Andrews ........................... 176/78 |

Primary Examiner—Samuel W. Engle
Assistant Examiner—Donald P. Walsh
Attorney, Agent, or Firm—Dean E. Carlson; R. E. Constant; S. H. Hamel

[57] ABSTRACT

A support grid is provided for holding nuclear fuel rods in a rectangular array. Intersecting sheet metal strips are interconnected using opposing slots in the strips to form a rectangular cellular grid structure for engaging the sides of a multiplicity of fuel rods. Spring and dimple supports for engaging fuel and guide rods extending through each cell in the support grid are formed in the metal strips with the springs thus formed being characterized by nonlinear spring rates.

1 Claim, 9 Drawing Figures

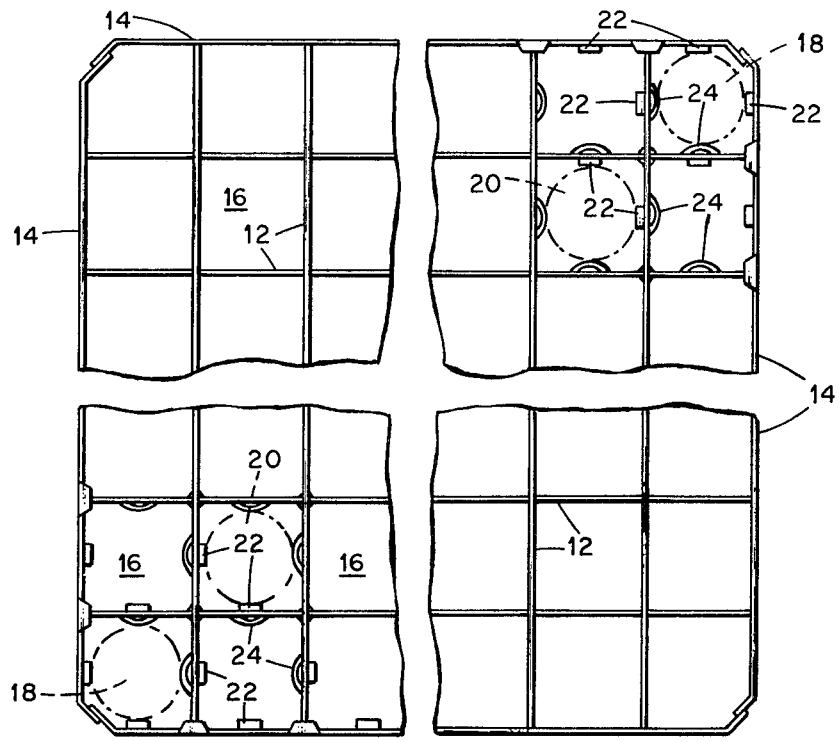
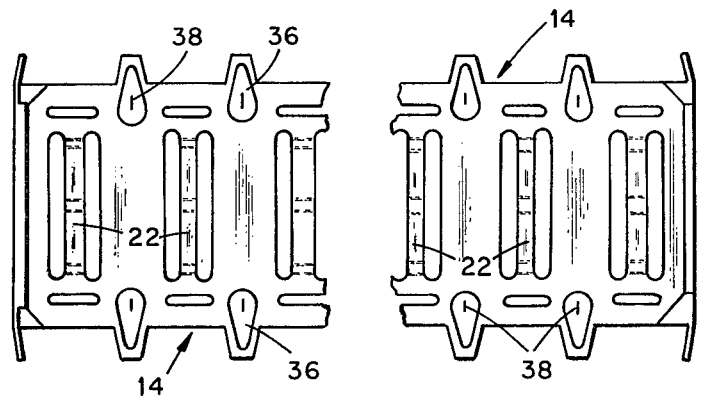
Fig. 1
Fig. 2

SUPPORT GRID FOR FUEL ELEMENTS IN A NUCLEAR REACTOR

The invention described herein relates generally to nuclear reactors and more particularly to an improved grid structure for supporting nuclear fuel rods in a rectangular array. It was developed in the course of, or under, a contract with the Energy Research and Development Administration.

BACKGROUND OF THE INVENTION

A nuclear reactor core arrangement in common use comprises a multiplicity of elongated, cylindrical, parallel, fuel-containing rods spaced apart in an upstanding, rectangular array. A liquid coolant, generally having moderating properties, flows vertically along the length of the rods through the interstitial space between the rods. Light and heavy water are widely used liquid coolants which also have moderating properties. Such core arrangement is typically found in, but not limited to, nuclear reactors of the classes designated as pressurized water reactors and boiling water reactors. Similar core arrangements may be found in reactors using other coolants such as liquid metals as used in fast breeder reactors. In some cases, groups of fuel rods are joined together in boxes or cans, which provide mechanical strength, to form fuel subassemblies which are in turn assembled in an upstanding array to form a core. Where no boxes or cans are used, the resulting core is referred to as an open lattice design.

An important aspect of mechanical design associated with the aforementioned core arrangement is the provision therein of support grids for holding the fuel rods in preselected positions. The function of the support grids is to maintain a minimum spacing between fuel rods so that the entire length of all fuel rods can be adequately cooled. Failure to maintain such spacing can result in "hot spots" in the fuel rods with cladding burnout and loss of fission products from the nuclear fuel. Such grids are normally designed to engage the fuel rods directly or end extensions provided to accommodate fission product gases given off by the nuclear fuel within the fuel rods. Consideration must be given to the mechanical strength of the grid, its poisoning effects on the nuclear properties of the core due to neutron absorption in the grid material, and its effect on coolant flow passing along the fuel rods.

Ideally, a support grid should be strong to resist lateral movement by the fuel rods, fabricated of a small amount of material to minimize its poisoning effect, and have a small physical cross sectional area normal to the coolant flow to minimize flow resistance to the coolant as it passes along the fuel rods. Fabrication costs should also be minimized through the use of a grid design which is simple and easily assembled.

A typical grid structure used to support and space fuel rods comprises a sheet metal assemblage formed of intersecting sheet metal strips. To restrain the fuel while allowing for thermal expansion, the fuel rods are held in the grid structure by springs formed in the sheet metal strips. Springs formed integrally in the sheet metal of the grid provide a grid structure characterized by good core neutron economy, structural redundancy, mechanical integrity, and manufacturing variability. The principle disadvantage of typical integral grid springs is the relatively stiff spring characteristic obtained from sheet metal stamping. It is desirable to use a doubly supported beam configuration for redundancy in the event of the spring fracture to prevent loss of the spring into the coolant channels where it could cause flow blockage.

It is, accordingly, a general object of the invention to provide a grid structure formed of sheet metal strips with grid springs for retaining fuel rods formed integrally in the sheet metal strips and grid springs having an initial force value adequate to restrain fuel rod motion under hydrodynamic excitation and a lesser force value thereafter to accommodate large deflections required by manufacturing tolerances and thermal expansion effects.

Other objects of the invention will be apparent from an examination of the following written description and the appended drawings.

SUMMARY OF THE INVENTION

In accordance with the invention, a support grid is provided for holding nuclear fuel rods in a rectangular array. Intersecting sheet metal strips are interconnected using opposed slots provided in the strips to form a rectangular cellular grid structure. A plurality of bow springs having nonlinear deflection characteristics and support dimples for engaging fuel rods passing through individual cells in the support grid are formed in each metal strip.

BRIEF DESCRIPTION OF THE DRAWINGS

FIG. 1 is a top view of a support grid made in accordance with the invention.

FIG. 2 is a side view of the support grid of FIG. 1.

DESCRIPTION OF THE PREFERRED EMBODIMENT

Figure 3:
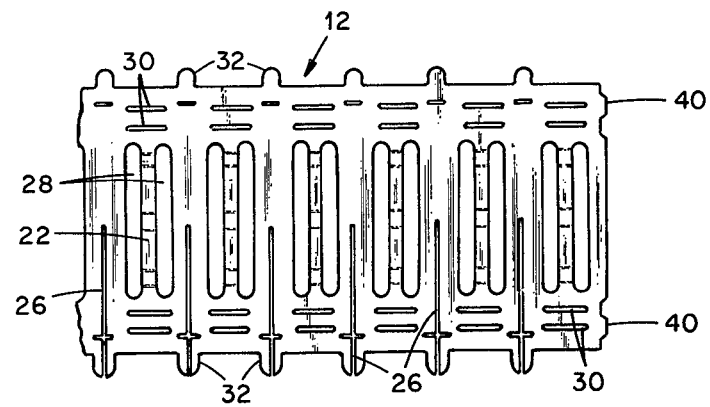
FIG. 3 is a plan view of a typical interior sheet metal partition strip used to fabricate the spacer grid assembly of FIGS. 1 and 2.

Referring to the drawings, FIGS. 1 and 2 show top and side views of a nuclear fuel rod grid assembly for supporting nuclear fuel rods in a rectangular array. As shown, the grid assembly is formed of a multiplicity of orthogonally intersecting and interlocking interior partition strips 12 of sheet metal bounded on four sides by side strips 14 defining a substantially square enclosure. In a particular embodiment of the invention, partition strips 12 and side strips 14 were formed of heat treated Inconel 718 strips which were 0.017 inches thick by 1.75 inches wide. Within the grid assembly are formed a number of grid cells 16 of square cross section, for accommodating and supporting fuel rods 18 and guide tubes 20 which provide lateral restraint to the grid assembly. Each interior strip 12 is provided with resilient means, such as springs 22 which are integrally formed in the strips to project into grid cells 16 to provide lateral support of the fuel rods 18 and to engage guide tubes 20. Each interior partition strip 12 is also provided with rigid support means, such as projections or rigid support dimples 24, which are located above and below each spring 22 and project from the strip in a direction opposite to that of the respective springs 22 into adjacent grid cells 16 to provide rigid lateral support to the fuel rods and guide tubes in opposition to the support provided by springs 22. Side strips 14 are formed with the springs 22 only since there is no fuel rod or guide tube to be supported outside of the boundaries of the grid assembly.

Turning now to FIG. 3, a typical interior partition strip 12 is provided with axially extending slots 26 which permit it to interlock with like partition strips extending orthogonally thereto to define a grid structure as shown in FIG. 1. Slots 28 define springs 22 for engaging fuel rods and guide tubes which extend through the grid assembly. Slots 30 likewise define dimples 24 which are described more fully in later reference to FIGS. 5 and 6. Small tab like projections 32 are provided at the top and bottom ends of strips 12 to facilitate welding operations at the intersections of the respective strips forming the grid assembly.

Figure 4:
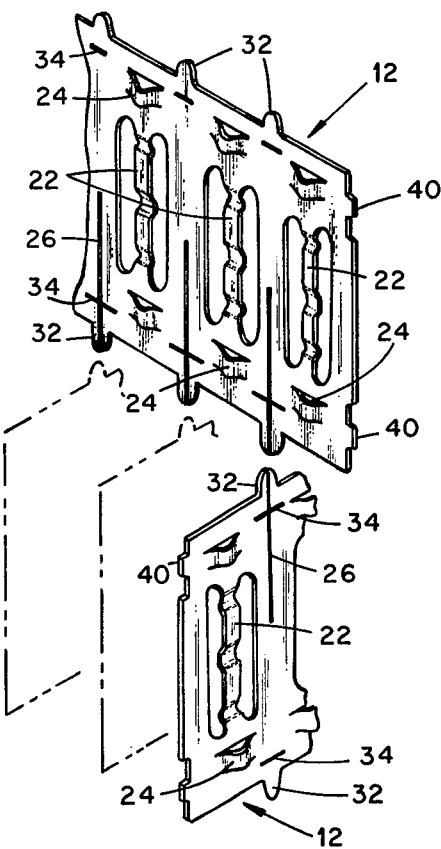
FIG. 4 is an isometric view of two interior sheet metal partition strip segments shown disengaged to illustrate the manner in which the strips interlock to form a rectangular cellular grid structure.

FIG. 4 further illustrates the manner in which partition strips 12 such as that illustrated in FIG. 3 are joined to form an interlocking grid structure. As shown, slots 26 are open to the bottom end of one set of parallel strips and open to the top end of a second set of parallel strips disposed orthogonally to the first set of strips to permit the two sets of strips to be intermeshed in an interlocking arrangement with the top and bottom ends of the two respective sets of strips lying in the same horizontal planes. The small slots 34 are provided for stress reduction purposes.

Figure 5:
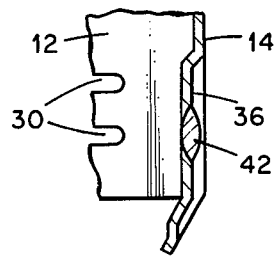
FIG. 5 is an enlarged vertical section view showing the attachment of the grid assembly side strips to an intersecting interior partition strip.

FIG. 5 is an enlarged vertical section view showing the attachment of a grid assembly side strip 14 to the end of an intersecting interior partition strip 12. As shown, the side strip is provided with an indentation 36 which conforms with the indentations provided at the top and bottom ends of each interior partition strip. Slots 38 (see FIG. 2) are provided in side strip 14 to receive tabs 40 (see FIG. 3). A weld 42 is made where each tab 40 fits within a slot 38 to securely attach the side plates to each interior partition.

Figure 7:
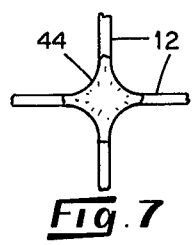
FIG. 7 is a top view of the welded joint of FIG. 6.
Figure 6:
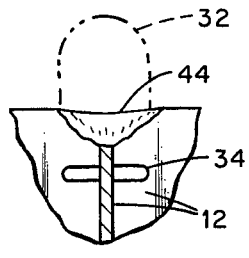
FIG. 6 shows an enlarged vertical section view of a welded joint formed at the intersection of two metal partition strips.

FIGS. 6 and 7 are enlarged vertical section and plan views illustrating the welds 44 used to join intersecting interior partition strips 12 at their points of intersection. Although the views illustrated are taken at the top of a grid assembly it should be understood that similar welds are provided at the corresponding bottom intersections. Projections 32, shown in phantom, are melted during the welding process to form weld 44.

Figure 8:
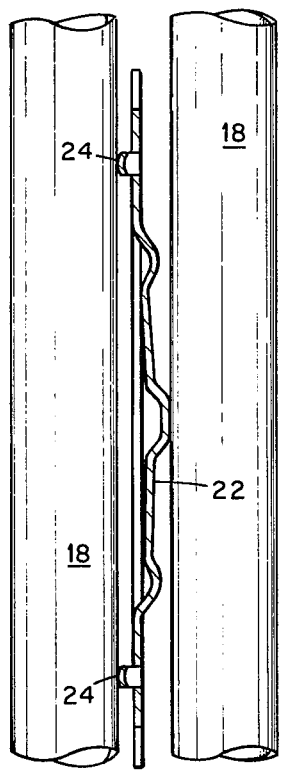
FIG. 8 is a sectional view of the interior partition strip shown in FIG. 3 taken through a support spring which bears against a fuel rod extending through the grid assembly.

FIG. 8 is a section view taken through a spring 22 which engages fuel rods 18 and guide tubes 20 as shown in FIG. 1. Each spring 22 is in the form of a shallow arch with convolutions. In a particular embodiment, it is 1.01 inches long by 0.100 inches wide, and has a free height 0.090 inches center-line-to-center-line. Springs 22 must provide a minimum spring force to hold the fuel rods against the rigid support dimples 24 and thus prevent impact fretting due to flow induced vibration of the fuel rods. However, the spring force provided by springs 22 must not be so large as to overstress the fuel rod cladding at its contact point with the spring or to cause excessive scratching of the fuel rods as they are passed through the grid during assembly. In addition, the frictional load on the spacer grid assembly due to the rods sliding through the grids must not overstress the grid structure itself. Springs 22 are designed so that their load-deflection characteristics are nonlinear, with the springs being relatively soft to a deflection of approximately 0.045 inches and then stiffer with increasing deflection. The initial low spring rate provides an initial force value adequate to restrain fuel rod motion under hydrodynamic excitation and a constant force value thereafter to accommodate large deflections required by manufacturing tolerances and thermal expansion effects. The subject spring design thus exhibits a definite nonlinear force-deflection characteristic of a type favored for fuel rod restraint; i.e. a force-deflection characteristic that is a practical equivalent to the ideal initial value constant force spring. The convolutions at the center and ends of spring 22 are multi-purpose (providing control of a fuel rod location in the grid cell and limit stops for excessive deflection) but they are important to the spring design since they provide the axial compliance in the spring. The spring is formed with slightly convex shape (toward the load) that "toggles" through an approximate null point to a slightly concave shape when the load is applied. As a result of the "large deflection" geometry changes against the axial restraint of the parent sheet metal forming the partition strips, the spring first exhibits a stiff force deflection characteristic that changes to a much less stiff characteristic as the null point is approached. As the deflection continues beyond the null point toward the concave shape, the spring stiffness increases again, to complete a nonlinear S-curve force-deflection characteristic. The axial stiffness of spring 22 tends to control its initial and final force-deflection characteristics. The spring stiffness near its null point is controlled primarily by its material and section properties and by its length.

Figure 9:
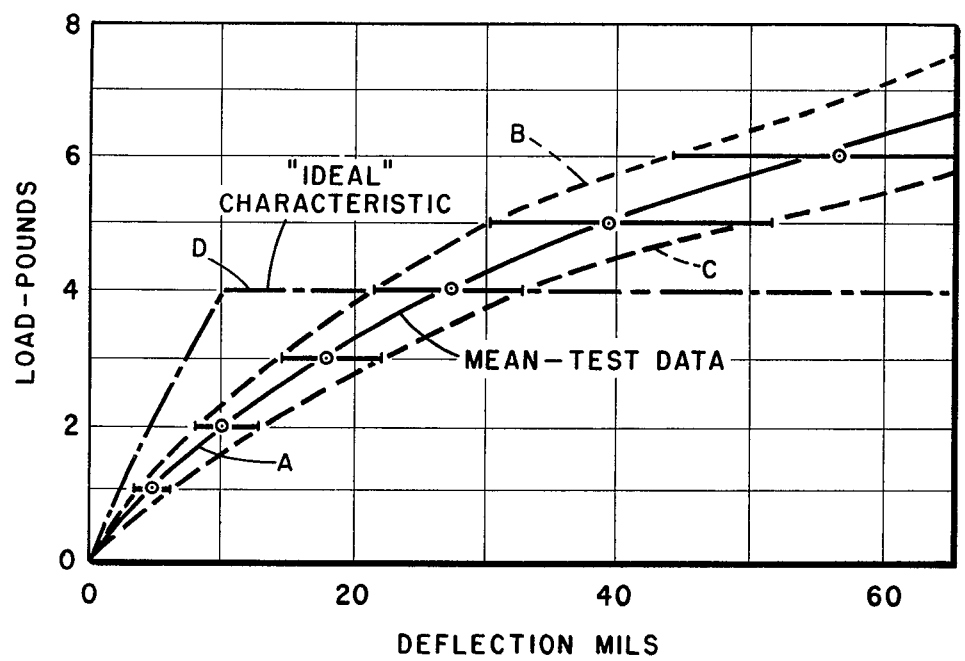
FIG. 9 is a graph illustrating the load-deflection characteristics of the fuel rod support springs used in the grid structure of the invention.

Tests of twenty-four spring specimens fabricated in accordance with the invention are graphically summarized in FIG. 9. The solid curve "A" depicts the mean values of force and deflection data for the group of springs while the broken curves "B" and "C" represent the envelope of data scatter. The particular springs tested were characterized by an initial stiffness of about 250 lbs/in. which decreased to a minimum of about 70 lbs/in. at their null point. An ideal spring curve for nuclear fuel rod constraint is shown at "D".

What is claimed is:

1. In a support grid for holding a multiplicity of nuclear fuel rods in a rectangular array wherein a plurality of intersecting sheet metal partition strips are joined to define cells for individually receiving said fuel rods, a plurality of resilient springs and rigid support dimples being formed in said partition strips whereby each of said fuel rods are supported against lateral displacement by at least two of said resilient springs and at least two of said rigid dimples disposed in opposition to said springs; the improvement characterized by said support dimples being formed between a pair of parallel slots, said resilient springs each comprising a toggle spring arm formed from said partition strip by a pair of elongated parallel slots in said partition strips perpendicular to said dimple slots and extending from near one of said support dimples to near another of said support dimples leaving a cross arm of said partition strip at each end of said spring arm perpendicular thereto, said toggle spring arm also having protrusions at each of said ends and a central larger protrusion all extending in the same direction with essentially straight members interconnecting said protrusions, each of said toggle springs arms normally being slightly convexed toward the interior of a corresponding cell on one side of said partition strip to engage a fuel rod extending therethrough and adapted to toggle through a null point by flexing of said spring arm and said cross-members to a slightly concave shape on the other side of said partition strip upon lateral deflection of said fuel rod, said spring arm and cross-member having nonlinear generally S-shaped force-deflection characteristics.

* * * * *